(12) United States Patent
Strasser et al.

(10) Patent No.: US 7,581,773 B2
(45) Date of Patent: Sep. 1, 2009

(54) ROLLER BLIND WITH CURVED SURFACE

(75) Inventors: Wolfgang Strasser, Aham (DE); Leonard Dobos, Kröning (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 153 days.

(21) Appl. No.: 11/431,940

(22) Filed: May 10, 2006

(65) Prior Publication Data

US 2006/0279106 A1 Dec. 14, 2006

(30) Foreign Application Priority Data

May 19, 2005 (DE) .................. 10 2005 023 062

(51) Int. Cl.
*B60R 7/04* (2006.01)
(52) U.S. Cl. .................. 296/1.09; 296/24.34; 296/153; 296/98; 220/350; 160/183; 312/297
(58) Field of Classification Search ............ 296/24.34, 296/153, 37.8, 98, 1.09; 220/350; 160/183, 160/185, 188, 231.1, 231.2; 312/297
See application file for complete search history.

(56) References Cited

U.S. PATENT DOCUMENTS

| | | | |
|---|---|---|---|
| 2,064,470 A | 12/1936 | Heckman | |
| 2,573,962 A | 11/1951 | Fox et al. | |
| 3,717,247 A | 2/1973 | Moore | |
| 3,870,391 A * | 3/1975 | Nims | 312/297 |
| 4,157,845 A * | 6/1979 | Queveau | 296/220.01 |
| 4,923,244 A | 5/1990 | Clenet | |
| 4,934,750 A | 6/1990 | Eichler et al. | |
| 5,169,699 A | 12/1992 | Prince | |
| 5,752,740 A | 5/1998 | Volkmann | |
| 6,217,112 B1 | 4/2001 | Linsenmeier et al. | |
| 6,231,940 B1 | 5/2001 | Aichner et al. | |
| 6,398,890 B1 | 6/2002 | Spoerle | |
| 6,558,497 B2 | 5/2003 | Franco et al. | |
| 6,846,032 B2 * | 1/2005 | de Gaillard et al. | 296/98 |
| 6,953,612 B2 | 10/2005 | Spoerle | |
| 7,087,842 B2 | 8/2006 | Belli et al. | |

(Continued)

FOREIGN PATENT DOCUMENTS

DE 3807880 9/1989

(Continued)

OTHER PUBLICATIONS

Search Report from European Application No. 06008980 dated Aug. 1, 2006.

(Continued)

*Primary Examiner*—Dennis H Pedder
(74) *Attorney, Agent, or Firm*—Wolf, Greenfield & Sacks, P.C.

(57) ABSTRACT

A roller blind for opening and closing the opening of a compartment, a storage box, a control console or similar enclosure, in particular for use in motor vehicles, is disclosed. At least one support element and at least one elastic layer disposed on the support element are included. Each support element has a curvature in its longitudinal direction with a deflection in a direction perpendicular to the plane of the opening to be closed by the roller blind. A method for the production of a roller blind is also disclosed.

25 Claims, 9 Drawing Sheets

U.S. PATENT DOCUMENTS

| | | |
|---|---|---|
| 7,343,956 B2 | 3/2008 | Schleef et al. |
| 2002/0005424 A1 | 1/2002 | Lange et al. |
| 2002/0108698 A1 | 8/2002 | Spoerle |
| 2003/0052129 A1 | 3/2003 | Fukuo |
| 2004/0003890 A1 | 1/2004 | Bauer et al. |
| 2004/0029030 A1 | 2/2004 | Murray |
| 2004/0065456 A1 | 4/2004 | Belli et al. |
| 2004/0118851 A1 | 6/2004 | Shinomiya |
| 2005/0098257 A1 | 5/2005 | Bauer et al. |
| 2005/0194825 A1 | 9/2005 | Kurz et al. |
| 2005/0252317 A1 | 11/2005 | Ueki |
| 2005/0276874 A1 | 12/2005 | Menaldo et al. |
| 2006/0066118 A1 | 3/2006 | Radu et al. |
| 2007/0102463 A1 * | 5/2007 | Thomas .................. 224/275 |

FOREIGN PATENT DOCUMENTS

| | | |
|---|---|---|
| DE | 40 10241 A1 | 4/1991 |
| DE | 42 20 670 A1 | 1/1994 |
| DE | 43 09 620 C2 | 1/1995 |
| DE | 19524177 | 8/1996 |
| DE | 196 46 809 A1 | 5/1998 |
| DE | 19654246 | 6/1998 |
| DE | 94 03 833 U1 | 3/1999 |
| DE | 19822425 | 2/2000 |
| DE | 19909642 | 4/2000 |
| DE | 19923512 A1 | 12/2000 |
| DE | 10023778 A1 | 11/2001 |
| DE | 20 2004 006 649 U1 | 10/2004 |
| EP | 1600330 A1 | 11/2005 |

OTHER PUBLICATIONS

Search Report from European Application No. 06000477 dated May 12, 2006.

Search Report from European Application No. 06007683.3-2421 dated Aug. 1, 2006.

Search Report from European Application No. 06 01 8781 dated Feb. 16, 2007.

* cited by examiner

ROLLER BLIND WITH CURVED SURFACE

BACKGROUND

1. Field

Aspects of the invention relate to a roller blind for opening and closing a tray, storage space, control console and/or other enclosures, in particular roller blinds for enclosures in motor vehicles, and a method for the production of roller blinds.

2. Discussion of Related Art

Roller blinds have been used in certain areas of motor vehicles, such as on covers of control elements, storage surfaces and particularly in the area of the center console, which permit movably opening and closing of these enclosures by hand. Because high requirements are placed on the appearance of the interior and in particular on these roller blinds in upper mid-range or top-range motor vehicles, roller blinds must be both functional and aesthetically pleasing.

Such roller blinds generally have a plurality of support elements or slats connected to each other by an elastic or flexible connecting layer in such a way that the support elements engage in a guide along which the roller blind moves. The guide may be located on the sides of the enclosure to be closed.

Typically, roller blinds have a decorative outer layer (i.e., the surface layer facing away from the opening to be closed) that is applied to the elastic layer connecting the support elements. The outer layer may be formed, for example, of metal, wood, leather, cloth or film. The decorative layer is designed to be attractive, have reasonable resistance to mechanical and atmospheric influences and light, and be easy to clean.

While the outer layer serves these functions, they are typically unable to absorb the high forces associated with the use and/or location of the roller blind. Thus, roller blinds are not typically found in the region of the central armrest or a side armrest in a vehicle.

SUMMARY

In one illustrative embodiment, a roller blind for movably opening and closing an enclosure defining an opening in a motor vehicle is provided. The roller blind has at least one support element and at least one layer made of elastic material disposed on the at least one support element. Each support element has a curvature in a longitudinal direction. A deflection of each support element extends parallel to and in the direction of the surface normal to the opening to be closed by the roller blind.

In another illustrative embodiment, a method for the production of a roller blind for use in a motor vehicle is provided. The method includes providing a plurality of support elements and an elastic layer; applying adhesive between the support elements and the elastic layer; pressing the elastic layer against the plurality of support elements along a center line of the elastic layer; and thereafter pressing the elastic layer against the plurality of support elements from the center line toward an edge of the elastic layer.

In yet another illustrative embodiment, a roller blind for movably opening and closing an enclosure defining an opening in a motor vehicle is provided. The roller blind includes a plurality of support elements, each support element having a curvature in a longitudinal direction along an outwardly facing surface and along an inwardly facing surface. A layer made of elastic material is disposed on the plurality of support elements to connect the plurality of support elements together.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
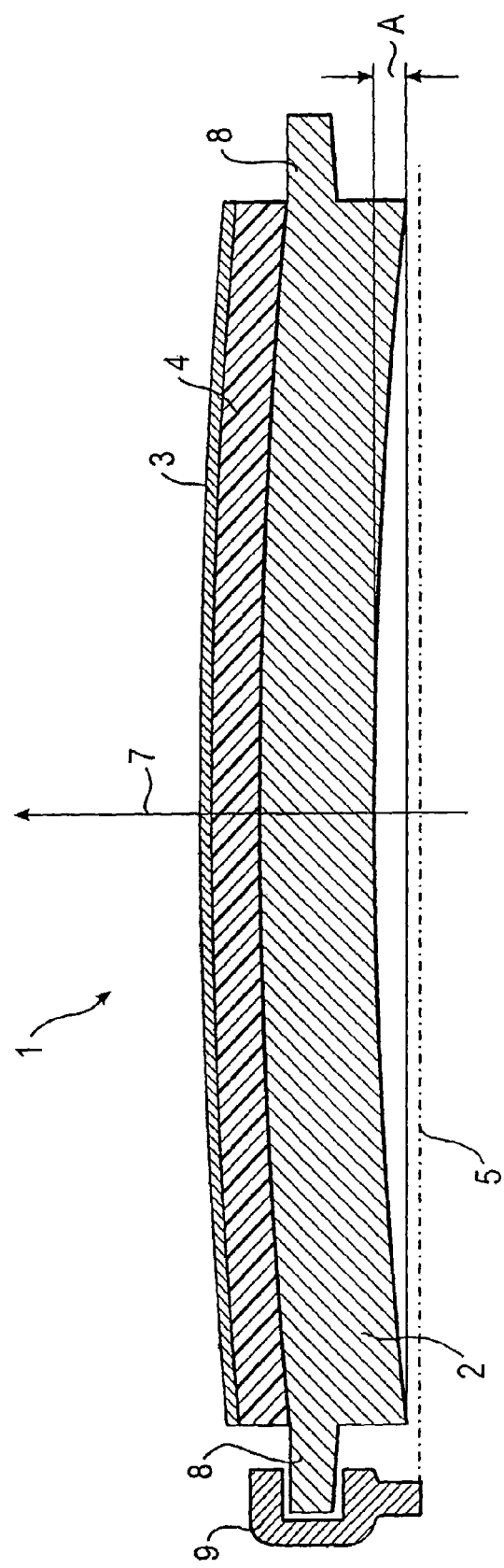
FIG. 1 is a cross-sectional view of a first embodiment.

Aspects of the invention are directed to roller blinds that are constructed and arranged to reliably absorb forces applied to a closed roller blind without material failure or malfunctions. Roller blinds are used in a motor vehicle for the opening and closing of compartments, storage boxes, control consoles or other enclosures. In one embodiment, the roller blind is constructed and arranged in a manner whereby forces applied to a vehicle armrest or center console may be suitably absorbed. In this manner, a storage compartment located in the armrest or center console may be covered with the roller blind and the roller blind may absorb or at least withstand the forces applied during normal use as a vehicle occupant rests his or her arm on the armrest or center console. It should be appreciated that the present invention is not limited in this regard and the roller blind may be used to cover other enclosures that are not subject to forces applied by the occupant's arm. In such situations, the roller blind need not be constructed in a manner to withstand the same force magnitude.

In one embodiment, the roller blind includes at least one support element, with the support element having a curvature in its longitudinal direction with a deflection extending in a direction perpendicular to the opening of the enclosure. The support element follows an arc shape which substantially protrudes outward from the plane fixed by the opening. In this manner, the roller blind has an increased rigidity. For example, for a given material thickness and material strength, roller blinds with straight support elements provide less rigidity, and thus only able to withstand less force, than roller blinds formed with curved support elements, as with the present invention. Accordingly, the roller blind with the curved support may be more suitable in the armrest or center console of a motor vehicle in that the roller blind can support greater loads. In addition, the arched design of the roller blind achieves an increase in the volume of a stowage space enclosed by the roller blind by curving outward from the opening plane of the enclosure.

In one embodiment, the support members have a uniform curved shape; however, the present invention is not limited in this respect. Further, the present invention is not limited to the shape of the actual curvature and hence it can, for example, follow a circular arc segment or a parabolic segment.

In one embodiment, the center of the support element has a greater deflection than at the end regions. However, other suitable shape characteristics may be employed, as the present invention is not limited in this respect. In one embodiment, the maximum deflection of the support element is half its length. In this way, a roller blind is provided which is substantially mirror-symmetrical and which is able to distribute the force acting on the roller blind uniformly on the guides for the roller blind. However, asymmetrical solutions (maximum deflection of the support element is ⅓ of its length maximal) are also contemplated, as the present invention is not limited in this regard.

In one embodiment, the deflection of curvature is more than approximately 1 cm. In one embodiment, the deflection of curvature is more than approximately 2 cm.

In one embodiment, guides are formed at opposing sidewalls of the enclosure and the support elements include an arrangement that slidably engages with the guides. In this way, the roller blind is mounted securely in the guides in a manner that enables the roller blind to be moved without significant effort.

In one embodiment, the roller blind includes a plurality of support elements disposed in parallel which are connected to each other by at least one elastic layer, although other suitable arrangements for coupling the support elements may be employed, as the present invention is not limited in this regard. In this embodiment, the resistance of the roller blind as it is opened or closed along a displacement path is substantially only that necessary to bend the elastic layer. In one embodiment, the support elements are disposed at approximately the same distance from each other, although the present invention is not limited in this regard. In one embodiment, the roller blind can be produced simply and in any length.

In one embodiment, each support element comprises a rod-shaped, profiled individual element. In one embodiment, each support element is similarly shaped, although the present invention is not limited in this respect. The support elements may be formed of any suitable material, as the present invention is not limited in this respect. Nevertheless, the support element can be made of any material having sufficient rigidity and resistance to thermal shock at the temperature fluctuations expected in a vehicle interior. Suitable materials include wood, metal or plastic. In one embodiment, plastic support elements are employed because of their comparably low weight and the fact that they can be molded into virtually any shape.

The support element may include reinforcement members to further add support. In one embodiment, the support element has on their underside (that is, on the side facing the enclosure) a reinforcing rib. In one embodiment two reinforcing ribs are provided. In another embodiment, three reinforcing ribs are employed. The ribs may be arranged in any suitable orientation, as the present invention is not limited in this respect. In one embodiment, the ribs are arranged parallel to one another. In one embodiment, the ribs are arranged in a direction extending along the length of the support element.

As mentioned, the roller blind can be used in the region of the central armrest and/or a door armrest in both the driver/passenger area and the rear area of a motor vehicle. As such, in one embodiment, the roller blind is constructed and arranged to absorb a compressive force of more than 700 N. In one embodiment, the roller blind is constructed and arranged to absorb a compressive force of more than 800 N.

The roller blind may be constructed to provide a comfortable surface on which the vehicle occupant can rest his or her arm. In one embodiment, the roller blind includes padding. It should be appreciated that the present invention is not limited in this respect and no padding need be employed.

In one embodiment, the roller blind is adapted to be attached in the central armrest and/or the side armrest of a motor vehicle in such a way that its padded surface is attached in alignment with a padded arm support that may surround the roller blind. In this way, the maximum use of the stowage space by the roller blind is supported in the area of arm supports as well. However, the roller blind need not be in alignment with the surrounding area, as the present invention is not limited in this respect.

A padded roller blind is disclosed in Applicant's copending U.S. patent application Ser. No. 11/346,994, which is hereby incorporated by reference in its entirety. Any one or more of the components of the roller blind described therein may be employed with or in the roller blind of the present application.

In one embodiment, the padding has a gas volume content of at least 20%; and in one embodiment, the padding has a gas volume content of between approximately 75% and approximately 96% of the volume occupied by the padding. In one embodiment, the padding is formed of a suitable foam material. Other padding materials may be employed, as the present invention is not limited in this respect.

A padded roller blind may also provide heat-insulating or sound-insulating properties. As such, the roller blind may be used for covering an air-conditioned area, for example, and/or compartments for keeping items cold or hot.

Other suitable arrangements for providing comfortable and/or insulating properties may be employed, as the present invention is not limited in this respect. In one embodiment, the padding has one or a plurality of chambers which can be filled with fillers such as a gas, a liquid, a gel, a suitable solid particle filling, or any combination of fillers. In one embodiment, the tactility and/or insulating properties of the roller blind can be set as desired. In addition, different tactility and/or insulating properties can be provided for different areas of the roller blind.

In one embodiment, the padding is embodied in such a way that it is thicker in the side areas of the roller blind than it is in the area of the maximum deflection of the curvature. In one embodiment, the thickness of the padding is matched to the deflection of the curved support elements in such a way that the curvature of the support elements is substantially compensated. In this manner, the roller blind has the advantage of curved support elements while simultaneously providing the occupants of the vehicle with a substantially level closed roller blind when this is desirable for reasons of appearance and/or the tactility of the area to be closed by the roller blind. However, the padding need not compensate for the curvature nor provide the roller blind with a level surface, as the present invention is not limited in this respect.

The roller blind may also include a decorative layer above the elastic layer or optionally above one or more paddings. The decorative layer may be formed of any suitable material, as the present invention is not limited in this respect. In this regard, the decorative layer may be formed of wood, plastic, fabric, metal or other suitable material, or any suitable combination of materials.

In one embodiment, the decorative layer includes leather or a leather-like material, which may provide suitable appearance and tactility characteristics. In one embodiment, the leather or leather-like material can be applied to the roller blind smoothly or with stitch seams in a suitable location. In one embodiment, the leather or leather-like layer can be applied in the style of a so-called "crushed leather". In one embodiment, when applied in the "crushed leather fashion", when the roller blind's elastic connecting layer is straight, that is in the relaxed state, there is a desired folding of the leather or leather-like layer and, when the roller blind is curved, the leather or leather-like layer is pulled smooth without placing excessive stress on the material.

The roller blind may be manufactured and/or assembled in any suitable manner, as the present invention is not limited in this respect. In one embodiment, a plurality of support elements are connected to each other by at least one elastic layer, and, as described, optionally with at least one padding and one decorative layer is applied to the elastic layer. Adhesive, which may be applied in a layer, connects the roller blind components together. In one embodiment, adhering the component takes place in such a way that a first contact pressure is applied along a center line of the component and then the final contact pressure is applied to the component from this center line going outward from the interior. In this way, a reliable and relatively permanent connection between the two components is ensured and with minimal or no folding and with minimal or no inclusion of air bubbles. Of course, the present invention is not limited in this respect, as the component layer may be applied in any suitable fashion.

Turning now to the figures, FIG. 1 shows a cross-sectional view of a roller blind 1 according to one embodiment. The roller blind includes a curved support element 2 having upper and lower curved surfaces and an elastic layer 3. As described above, a padding 4 may be additionally disposed below the elastic layer 3.

The roller blind 1 may be constructed to bridge an opening of an enclosure that is defined by a plane indicated by dot-dash line 5. As noted above, the roller blind is curved whereby the amount of curvature is shown as deflection A of the support element 2. The deflection A is disposed along line 7, which is perpendicular to plane 5. As shown, in one embodiment, the support element 2 also includes in its side regions a tab 8 for engaging guides 9 (only one of which is shown), which are in turn attached to the sidewalls (not shown) surrounding the enclosure. The support element may be formed so as to have a uniform thickness between the tabs 8, as shown.

Figure 2:
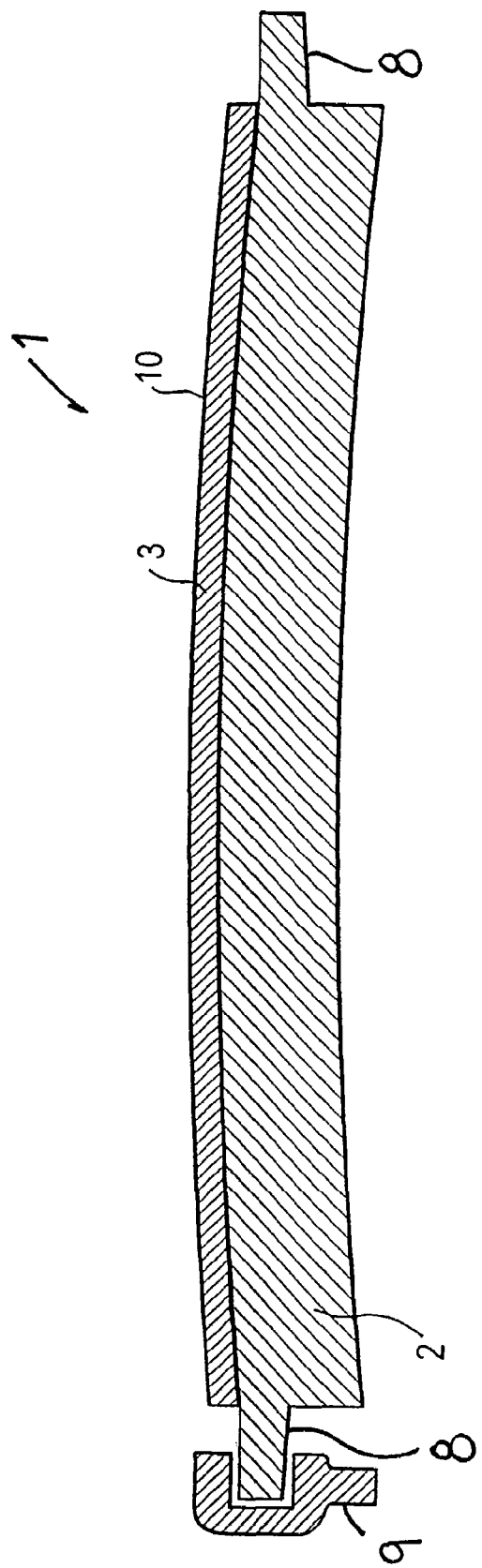
FIG. 2 is a cross-sectional view of a second embodiment.
Figure 4:
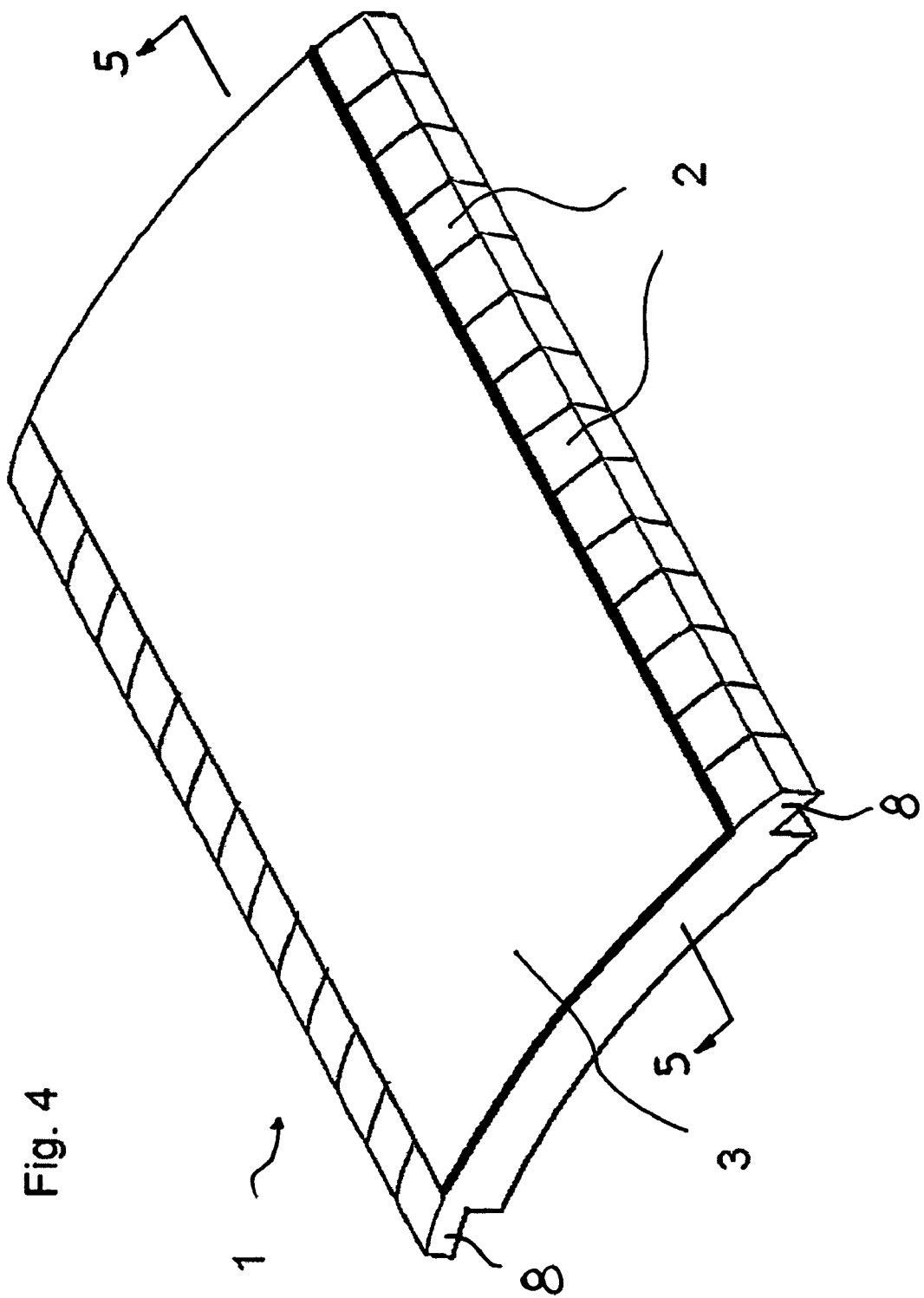
FIG. 4 is a perspective view of a roller blind according to one embodiment.

FIG. 2 shows the cross section of another embodiment of the roller blind 1. In this embodiment, the roller blind includes curved support element 2 and soft elastic layer 3. The elastic layer 3 is employed to connect a plurality of support elements 2 together. FIG. 4 shows the plurality of support elements 2 with the elastic layer 3 overlying them. In addition, in one embodiment, as shown in FIG. 2, a thin film 10 acting as a decorative layer is disposed on the top side of this elastic layer 3.

Figure 3:
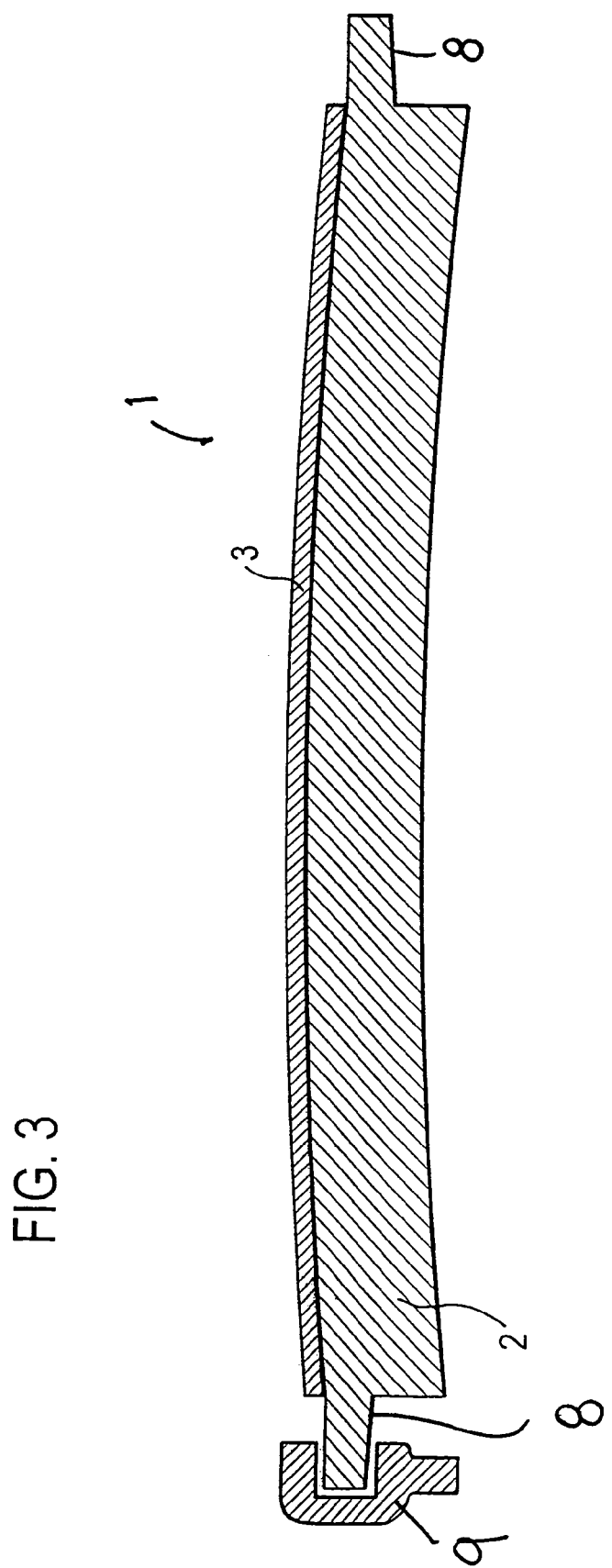
FIG. 3 is a cross-sectional view of a third embodiment.

FIG. 3 shows yet another embodiment of the roller blind. In this embodiment, a layer of leather 3 may be employed to connect the support elements 2 in parallel relation to each other. In this embodiment, leather layer 3 functions as the elastic layer described above with reference to FIGS. 1 and 2.

Figure 5:
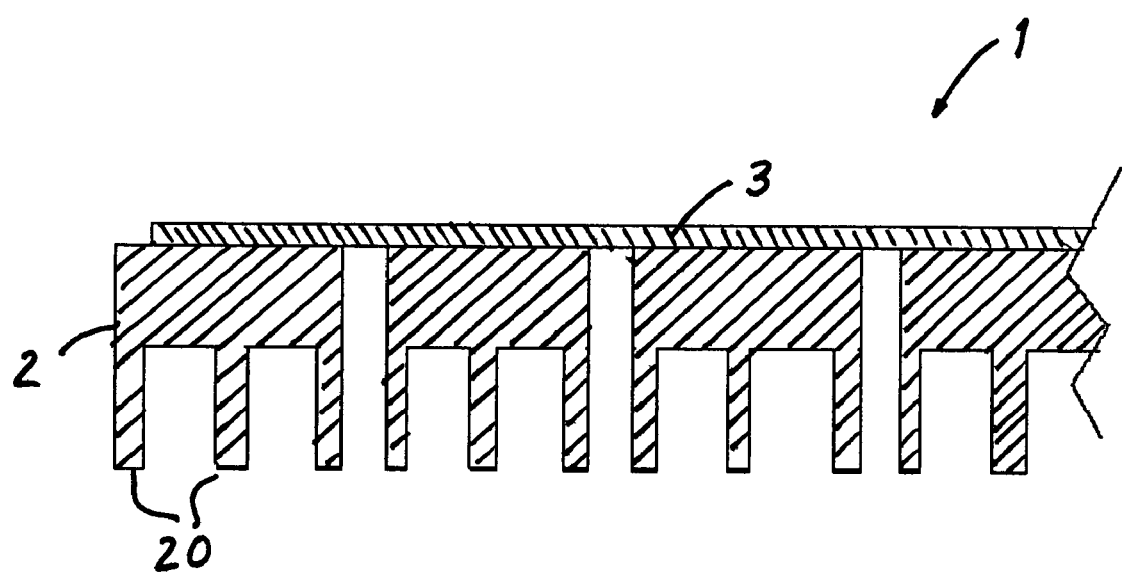
FIG. 5 is a cross-sectional view of another embodiment taken along line 5-5 of FIG. 4.

As mentioned above, the support element may include reinforcement members to further add support. In the embodiment shown in FIG. 5, which is a partial cross-sectional view of the roller blind taken along line 5-5 of FIG. 4, one or more support elements 2 includes reinforcing ribs 20 formed on the underside of the support element.

Figure 6:
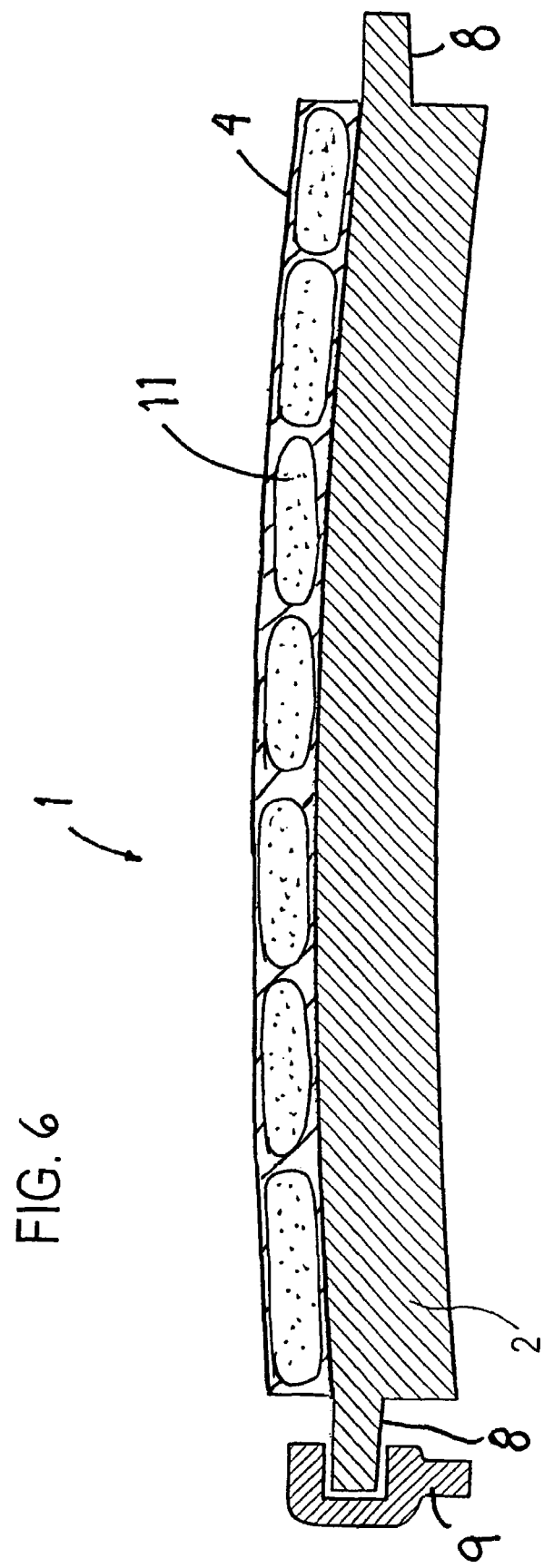
FIGS. 6 and 7 are cross-sectional views of alternative embodiments of the roller blind; and, FIGS. 8 and 9 show various locations for the roller blind in the motor vehicle.

As noted above, the padding may include one or a plurality of chambers 11, which can be filled with a gas, a liquid, a gel or a suitable solid particle filling. In the embodiment shown in FIG. 6, the padding includes a plurality of chambers.

Figure 7:
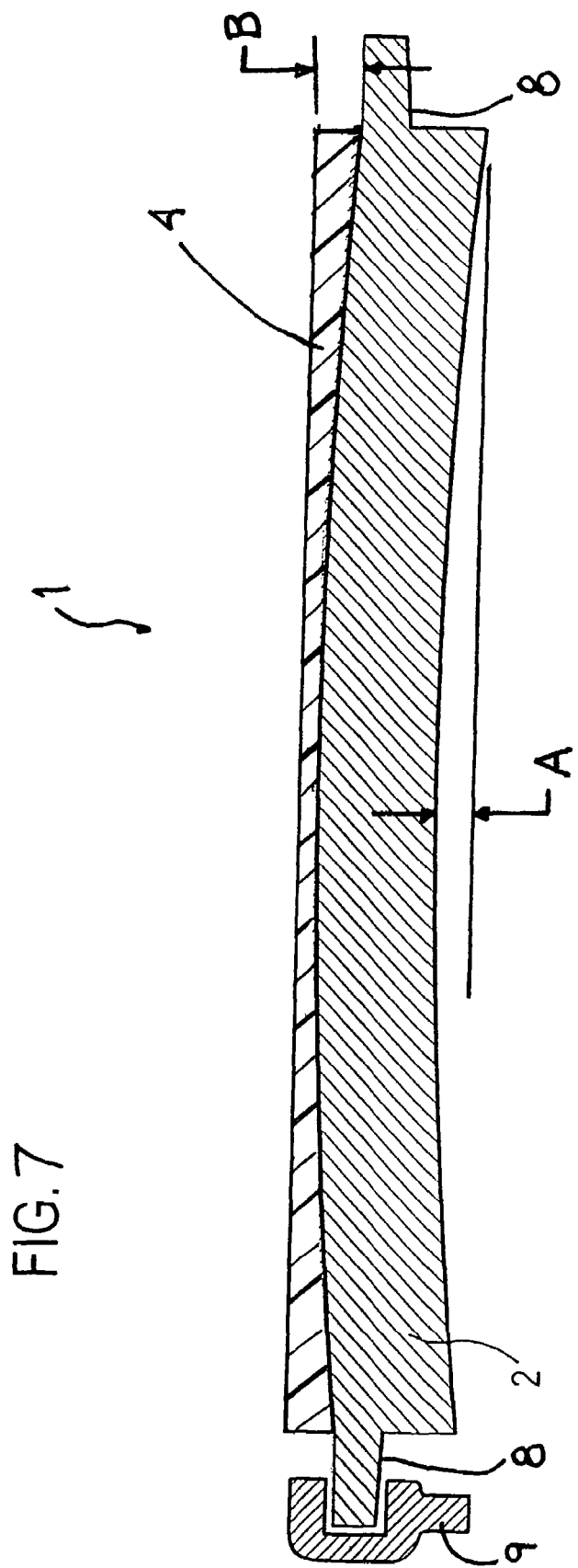

As shown in FIG. 7, in one embodiment, the padding is embodied in such a way that it is thicker in the side areas of the roller blind than it is in the area of the maximum deflection of the curvature. In one embodiment, the thickness of the padding 4 is matched to the deflection of the curved support elements in such a way that the curvature of the support elements is substantially compensated, whereby the top surface of the roller blind is substantially flat. As shown in the embodiment of FIG. 7, the thickness B of the padding layer at the side areas is approximately equal to the amount of deflection A at the center of the support element.

Figure 8:
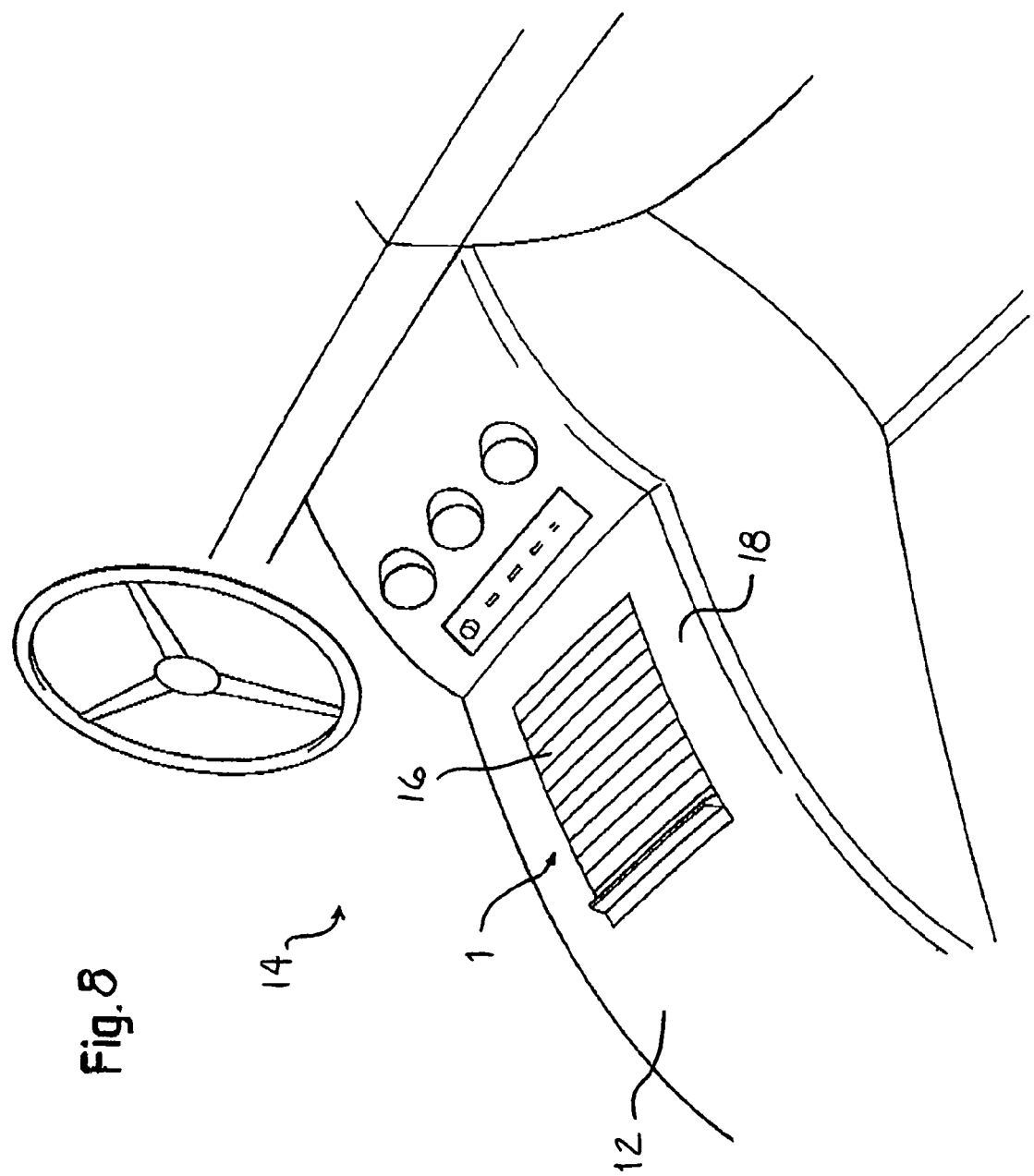
Figure 9:
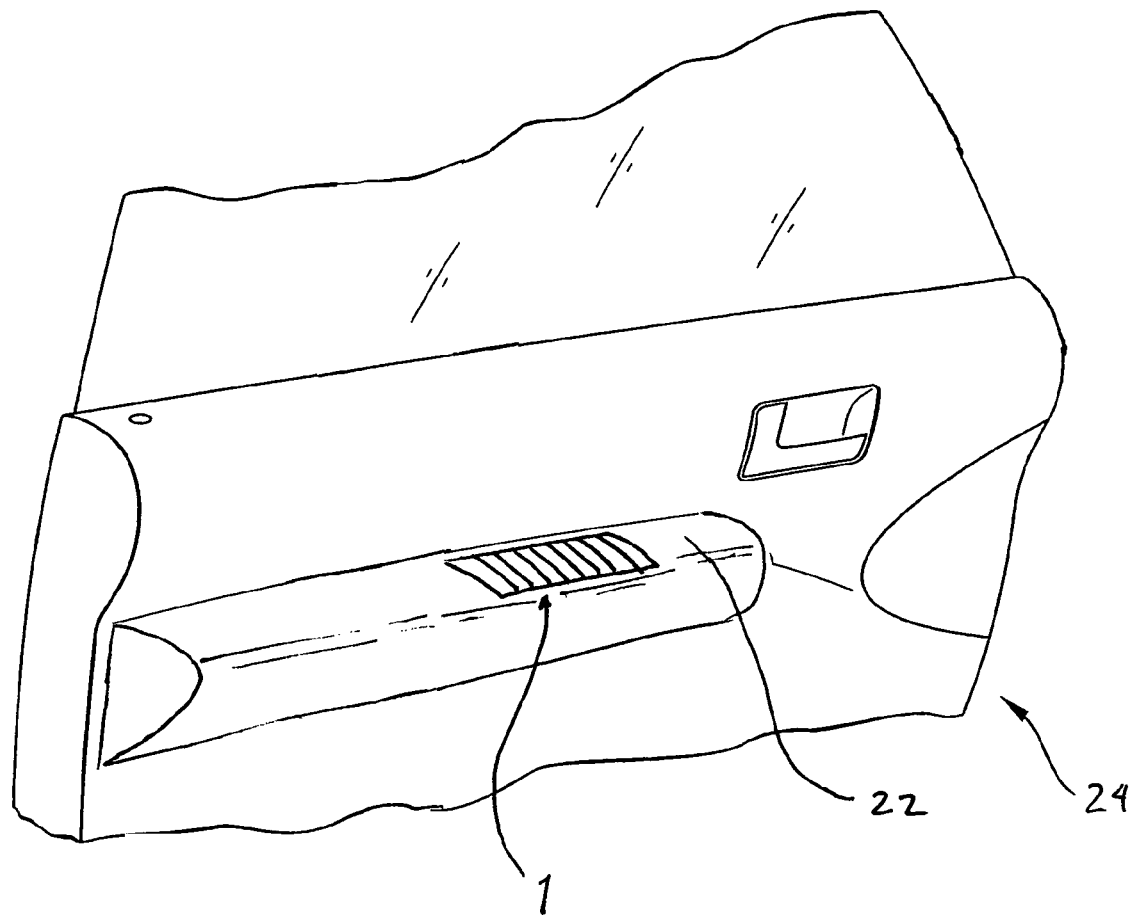

The roller blind may be installed on the motor vehicle in any suitable location, as the present invention is not limited in this respect. In one embodiment, as shown in FIG. 8, the roller blind 1 is located in the center console 12 of the motor vehicle 14. In addition or in the alternative, the roller blind 1 may be located on the armrest 22 of a door 24, as shown in FIG. 9.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the foregoing description and drawings are by way of example only.

What is claimed is:

1. A roller blind for movably opening and closing an enclosure defining an enclosure opening in a motor vehicle, the enclosure opening defining an opening plane, the roller blind having a plurality of support elements disposed parallel to each other at approximately equal distances from each other, each support element having an upper side and a lower side; at least one layer made of elastic material disposed on the upper side of and connecting the support elements to each other and overlying the support elements, whereby a continuously closed outer surface is obtained, and a padding is disposed on the support elements below the at least one layer made of elastic material, wherein the upper side of each support element has a first curvature in a longitudinal direction and the lower side of each support element has a second curvature, with the first curvature and the second curvature extending in a direction away from the opening plane and outwardly from the enclosure opening, each support element comprising a tab at each end thereof, each tab constructed and arranged to slidably engage a corresponding guide in each of two opposing side walls of the enclosure.

2. The roller blind according to claim 1, wherein the second curvature extends in a direction away from the opening plane and away from the enclosure to define a deflection, wherein the deflection at a center point of the support element is more than 1 cm.

3. The roller blind according to claim 1, wherein the second curvature extends in a direction away from the opening plane and away from the enclosure to define a deflection, wherein the deflection at a center point of the support element is more than 2 cm.

4. The roller blind according to claim 1, wherein each support element comprises a rod-shape.

5. The roller blind according to claim 1, wherein each support element comprises a plurality of reinforcing ribs disposed on a side adapted to face the enclosure.

6. The roller blind according to claim 5, wherein each of the plurality of reinforcing ribs are arranged generally parallel to one another.

7. The roller blind according to claim 5, wherein the plurality of reinforcing ribs comprises three reinforcing ribs.

8. The roller blind according to claim 1, wherein the roller blind is constructed and arranged to absorb a compressive force of more than 700 N.

9. The roller blind according to claim 1, wherein the roller blind is constructed and arranged to absorb a compressive force of more than 800 N.

10. The roller blind according to claim 1, wherein the padding has a gas volume content of at least 20%.

11. The roller blind according to claim 1, wherein the padding has a gas volume content of between approximately 75% and approximately 96%.

12. The roller blind according to claim 1, wherein the padding comprises at least one chamber.

13. The roller blind according to claim 1, wherein the second curvature extends in a direction away from the opening plane and away from the enclosure to define a deflection, wherein the deflection has a maximum deflection and wherein the padding is thicker at a side region of the roller blind than at a region of the maximum deflection.

14. The roller blind according to claim 13, wherein a thickness of the padding at the side region is approximately equal to the maximum deflection.

15. The roller blind according to claim 1, further comprising a decorative layer disposed over the at least one layer made of elastic material.

16. The roller blind according to claim 15, wherein the decorative layer comprises one of leather and a leather-like material.

17. A roller blind for movably opening and closing an enclosure defining an opening in a motor vehicle, the roller blind comprising:
 a plurality of support elements, each support element having an outwardly facing surface and an inwardly facing surface, the outwardly facing surface having a first curvature in a longitudinal direction and the inwardly facing surface having a second curvature in a longitudinal direction, the first curvature and the second curvature each extending in a direction away from the opening and outwardly from the enclosure;
 a layer made of elastic material disposed on the plurality of support elements to connect the plurality of support elements together; and
 padding disposed on the at least one support element below the layer of elastic material.

18. The roller blind according to claim 17, wherein the second curvature extends in a direction away from the opening and outwardly from the enclosure to define a deflection, wherein the deflection at a center point of the support element is about 1 cm.

19. The roller blind according to claim 17, wherein the roller blind is constructed and arranged to absorb a compressive force of more than 700 N.

20. The roller blind according to claim 17, wherein the padding has a gas volume content of at least 20%.

21. The roller blind according to claim 17, wherein the padding has a gas volume content of between approximately 75% and approximately 96%.

22. The roller blind according to claim 17, wherein the padding comprises at least one chamber.

23. The roller blind according to claim 17, wherein the second curvature extends in a direction away from the opening plane and away from the enclosure to define a deflection, wherein the deflection has a maximum deflection and wherein the padding is thicker at a side region of the roller blind than at a region of the maximum deflection.

24. The roller blind according to claim 17, further comprising a decorative layer disposed over the layer of elastic material.

25. A roller blind for movably opening and closing an enclosure defining an opening in a motor vehicle, the roller blind comprising:
 a plurality of support elements, each support element having an outwardly facing surface and an inwardly facing surface, the outwardly facing surface having a first curvature in a longitudinal direction and the inwardly facing surface having a second curvature in a longitudinal direction, the first curvature and the second curvature each extending in a direction away from the opening and outwardly from the enclosure;
 a layer made of elastic material disposed on the plurality of support elements to connect the plurality of support elements together; and
 padding disposed on the support elements below the layer of elastic material, and wherein the roller blind is disposed in an armrest region of the motor vehicle.

\* \* \* \* \*